United States Patent [19]

Hashimoto et al.

[11] Patent Number: 4,734,402
[45] Date of Patent: Mar. 29, 1988

[54] FEEDS FOR DOMESTIC ANIMALS AND METHOD FOR BREEDING THEM

[75] Inventors: Kiyoshi Hashimoto, Tokyo; Tadashi Nakazawa, Yokohama; Hidemasa Hidaka, Urawa; Toshiaki Eida, Chignsaki; all of Japan

[73] Assignee: Meiji Seika Kaisha, Ltd., Tokyo, Japan

[21] Appl. No.: 823,990

[22] Filed: Jan. 31, 1986

Related U.S. Application Data

[63] Continuation of Ser. No. 636,347, Jul. 31, 1984, abandoned.

[30] Foreign Application Priority Data

Aug. 5, 1983 [JP] Japan ................ 58-144248

[51] Int. Cl.$^4$ ............................................. A61K 31/70
[52] U.S. Cl. .......................................... 514/54; 426/2; 426/807
[58] Field of Search ................... 426/2, 623, 630, 636, 426/807; 514/60, 54

[56] References Cited

U.S. PATENT DOCUMENTS

| | | | |
|---|---|---|---|
| 3,868,467 | 2/1975 | Olson | 426/2 |
| 3,911,114 | 10/1975 | Cardon | 424/128 |
| 3,953,609 | 4/1976 | Farr | 426/2 |
| 4,010,262 | 3/1977 | Cardon et al. | 514/60 |
| 4,120,952 | 10/1978 | Cardon | 514/60 |

FOREIGN PATENT DOCUMENTS

| | | | |
|---|---|---|---|
| 1499717 | 2/1978 | United Kingdom | 426/2 |
| 2072679 | 10/1981 | United Kingdom | 426/2 |

*Primary Examiner*—R. B. Penland
*Attorney, Agent, or Firm*—James J. Ralabate

[57] ABSTRACT

A feed for domestic animals containing saccharides mainly composed of fructooligosaccharide is particularly effective for growing young domestic animals. The feed can remedy the scours or loose passage frequently occuring young domestic animals in the weaning period of young animals and remarkably increase the weight of the young animals.

3 Claims, 2 Drawing Figures

FEEDS FOR DOMESTIC ANIMALS AND METHOD FOR BREEDING THEM

This is a continuation of application Ser. No. 06/636,347 filed July 31, 1984, now abandoned.

FIELD OF THE INVENTION

This invention relates to a feed for domestic animals in growing period containing saccharides mainly composed of fructooligosaccharide and a method of breeding domestic animals using the feed for remedying scours of domestic animals frequently occuring in the weaning period to promote the growth thereof.

BACKGROUND OF THE INVENTION

Recently, with the increase of Europeanization of dietary life, the demand for meat is increased and the products for supplying meat has desired a development of an efficient breeding method of domestic animals. The term "domestic animals" used throughout this disclosure will refer to those animals used for supplying meat and meat products for human consumption. The most important problem in stock-breeding is how to increase the production efficiency and hence the attempt of increasing the breeding density of domestic animals has been made but such an attempt rather deteriorates the breeding environment to frequently cause scours or a loose passage and thus make worse the growth of domestic animals. In particular, the inferior growth of young animals after weaning gives a large influence on the subsequent growth and the initial inferior growing period is greatly over the ordinary growing period of the animal to make worse the breeding efficiency and hence reduce the economical efficiency.

For the purpose of remedying the scours and loose passage of young animals, there is proposed a method of incorporating an antibiotic in a feed or a method in administering a large amount of an antibiotic, etc., for the treatment of a disease of domestic animals but the effect is not yet satisfactorily. On the other hand, for preventing the scours of domestic animals, the use of various lactic acid bacteria and L. bifidus solely or as a mixture of them is proposed (Japanese Patent Publication No. 47,907/'72 and Japanese Patent Publication (unexamined) Nos. 118,827/'76 and 9770/'80). Also, a method of applying various treatments to milk whey as a starting material and adding it to a feed for domestic animals for increasing the microorganisms existing in the alimentary canals of animals is proposed (Japanese Patent Publication No. 15,829/'79).

Some of the products industrially produced based on the above-described method are on the market and the effect is not yet satisfactorily and problems have been left at present for remedying the scours of domestic animals and efficiently increasing the weight of them.

SUMMARY OF THE INVENTION

An object of this invention is to provide a feed for domestic animals capable of remedying the scours of domestic animals occuring, in particular, in the weaning period for efficiently increasing the weight of the domestic animal.

Another object of this invention is to provide a method of breeding domestic animals using the feed.

That is, according to this invention, there is provided a feed for domestic animals in growing period, comprising saccharides containing fructooligosaccharide as a main component.

The invention is also a breeding method for domestic animals, which comprises breeding doemstic animals by the feed, wherein the scours of domestic animals occuring in the weaning period are remedied to remarkably increase the weight of the domestic animals.

DESCRIPTION OF THE PREFERRED EMBODIMENT

Figure 1:
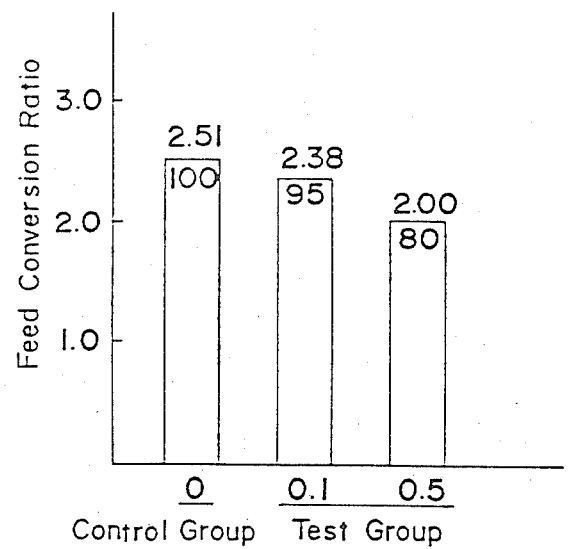
FIG. 1 is a graph showing a feed conversion ratio in the case of breeding domestic animals using the feed of this invention by the method shown in Example 1 and FIG. 2 is a graph showing the body weight gain of domestic animals in the case of breeding the domestic animals using the feed of this invention by the method shown in Example 2.

The saccharides mainly composed of fructooligosaccharide for use in this invention are a sugar composition obtained by the reaction of, for example, sucrose and fructosyltransferase and are saccharides composed of fructooligosaccharide formed by bonding 1 to 4 fractose molecules to sucrose and a mixture of sucrose, glucose, fructose, etc., (see Japanese Patent Publication (unexamined) No. 154,967/'81).

Then, an example of producing the sugar composition is shown below.

Production Example:

In each of two test tubes was placed 10 ml of a BS culture medium containing 5.0% sucrose, 1.0% peptone, 0.7% a meat extract and 0.3% sodium chloride and after sterilizing the medium for 30 minutes at 120° C., one platinum loop of *Aspergillus niger* (*The genus Aspergillus*, 1965, page 293, published by Williams and Wilkins Corporation) was inoculated in the culture medium followed by cultivation for 24 hours at 28° C.

Then, 10 ml of the culture fluid thus obtained was transferred in each of two Erlenmeyer flasks containing 200 ml of a BS culture medium (sterilized for 30 minutes at 120° C.) and a shaking cultivation was performed as pre-cultivation for 24 hours at 28° C.

In a 30 liter jar fermentator was placed 20 liters of a BS culture medium and after sterilizing the medium for 30 minutes at 120° C. and then cooling the medium, 400 ml of the seed culture fluid was transferred followed by cultivation for 72 hours at 28° C. and at 300 r.p.m. After the cultivation was finished, the myceriums were removed by filtration to provide 20 liters of a culture filtrate. Thereafter, 20 liters of the culture filtrate was concentrated by a ultrafiltration and purified to provide 2 liters of a broth. The enzyme activity of the broth was 240 units/ml.

In 6.7 liters of water was dissolved 10 kg of sucrose, after adjusting the pH of the solution of 5.0, the broth of 48 units per gram of sucrose was added to the solution, and a transition reaction was performed for 48 hours at 50° C. After the transition reaction was over, the reaction mixture was heated at 100° C. for 15 minutes to inactivate the enzyme and then 0.5% active carbon to solid content was added to the mixture to perform decoloration. Then, after removing active carbon, the reaction mixture was treated with ion exchange resins, Amberlite IR 120 B and Amberlite IRA 411 and then concentrated into a concentration of 75% by weight to provide 12 kg of a sugar compositon composed of 26% glucose, 18% sucrose, 40% GF$_2$, 14% GF$_3$ and 2% GF$_4$.

The feed of this invention containing the saccharides composed of fructooligosaccharide as the main component is obtained by adding the above-described saccharides mainly composed of fructooligosaccharide to an ordinary feed for domestic animals. The effective addition amount of the saccharides of this invention is, preferably 0.1 to 5 parts by weight per 100 parts by weight of an ordinary feed for domestic animals.

In the method of breeding domestic animals, in particular, the weaning period using the feed for domestic animals of this invention, the scours frequently occuring in domestic animals in the weaning period can be remedied and the growth of them can be promoted by using the feed containing the saccharides mainly composed of fructooligosaccharide of this invention as the feed for domestic animals.

The result of administrating the feed of this invention to domestic animals such as pigs showed that the number of the young animals showing scours and a loose passage was greatly reduced, the amount of feed intake was greatly increased the body weight of the animals, and the breeding efficiency was increased.

The good results which have never been obtained by conventional feeds give a large usefulness for stockbreeding. When the breeding for young animals is changed from natural breeding to artificial breeding for growing period after about one month since their birth for performing efficient growth in the growing period of the domestic animals, the animals are liable to cause scours or loose passage by various causes to cause inferior growth. As the result thereof, some of the young animals die of a disease by a secondary infection or some of the young animals grow in a low increase of weight until they grow up and hence the growing period of such animals is longer than that of healthy animals to give large economical loss for livestock raisers. Accordingly, it is important and necessary for livestock raisers that the growth of young animals is good.

The test results of free supply of a mixture of 0.1 to 5% the saccharides mainly composed of fructooligosaccharide effective for the increase of the weight of domestic animals and an ordinary feed for domestic animals in the growing period to domestic animals are shown in Table 1.

Table 1

| Percentage of fructooligo-saccharide in feed | Breeding test result for piglets | | |
|---|---|---|---|
| | Relative ratio of body weight gain | Relative ratio of feed conversion | State of occuring scours and loose passage |
| none | 100 | 100 | very large |
| 0.1 | 124 | 95 | small |
| 0.5 | 138 | 80 | very small |
| 2.0 | 133 | 83 | very small |
| 5.0 | 131 | 89 | very small |

The results of the above table show that in the test groups using the feeds containing fructooligosaccharide, the increase of the weight of piglets is superior to the groups of adding feeds containing no fructooligosaccharide and also the feed conversion ratio in the former groups is lower than that in the latter group. The addition of 0.1% to 5% fructooligosaccharide gives a desired effect but from the economical view point, the addition of 0.1% to 0.5% is preferred. About the occuring state of the scours and loose passage, a remarkably improved effect is obtained in the group using the feed containing fructooligosaccharide and this is considered to be caused by that fructooligosaccharide gives a preferred influence on useful bacteria in the intestines of domestic animals in some form.

Since the starting material for fructooligosaccharide is sucrose, fructooligosaccharide has a proper sweetness and fits well for the taste of domestic animals.

Then, the following examples are intended to illustrate practically the present invention but not to limit in any way.

EXAMPLE 1

In a swinery wherein sawdust was spread over the floor, piglets of 30-day age were divided into one control group and two test groups with one group being 15 pigs and they were test-bred for 30 days. The piglets in the control group were bred using a commercially available feed for growing piglet in the weaning period and the piglets in each of the test groups were bred using the feed of this invention prepared by mixing 0.1 part by weight or 0.5 part by weight of saccharides containing fructooligosaccharide prepared by the production example described above with 100 parts by weight of the ordinary feed used for control group. The feed was supplied in the form of ceaseless-supply by supplying a fresh feed without causing shortage of feed by watching the remaining feed every day and water was supplied as the form of free-supply. Also, a number plate was attached to the ear of each piglet so as to check each pig for obtaining various data. At the initiation of the test and at the end of the test, the weight of each pig was measured to determine the increase of the weight. The amounts of the feed intake during the growing period were summarized and each feed conversion ratio was calculated. Also, the state of occuring the scours or loose passage was investigated every day since the initiation of the test and the end of the test.

The results showed that the body weight gain of the piglets in the test groups using the feeds containing fructooligosaccharide of this invention was all 1.24 to 1.38 times compared with the pigs of the control group. Also, the amount of feed intake of the test group was 1.17 to 1.35 times compared with the control group. The feed conversion ratio which was the ratio of both values was good in each of the test groups. The results are shown in FIG. 1.

Also, the frequency of the scours and loose passage of piglets was higher than 50% in the contrast group while it was improved to be lower than 5% in the test groups.

EXAMPLE 2

In a swinery having a concrete floor, piglets born from 4 mother pigs were divided into four groups after weaning with one group being 8 piglets so that each group contained two piglets born from a same mother pig for increasing the reliability of the test. For the control group, a commercially available feed for growing piglets in the weaning period was used and for the test groups, the test feed of this invention prepared by adding 0.5, 2.0 or 5.0 parts by weight of the saccharides containing fructooligosaccharide obtained in the aforesaid production example to 100 parts by weight of the feed used for the contrast group. The feed was supplied in the form of a ceaseless supply by supplying the feed so that a definite amount of feed always existed and water was freely ingested. Thereafter, the same manner as in Example 1 was followed.

Figure 2:
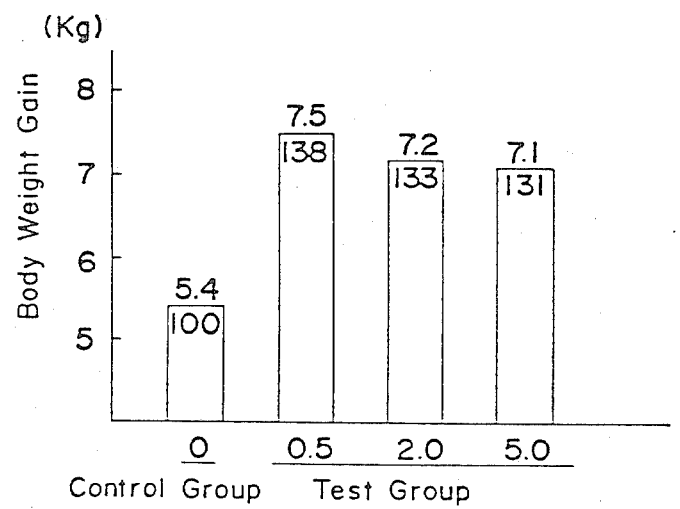

The results thus obtained were as shown in FIG. 2.

In spite of that the initial weight of each piglet in each test group and control group was almost same, the weight increase of each piglet in the control group in the growing period of one month was 5.4 kg only. On the other hand, the weight increase of each piglet in the test groups using the feeds containing fructooligosaccharide was above 7 kg. Also, the weight increase distribution was broad from a low weight increase to high weight increase in the control group. On the other hand, the weight increase distribution of the pigs in the test groups using the feeds containing fructooligosaccharide was distributed on a relatively large weight as a striking feature. The amount of feed intake was good in the test groups and was 1.1 to 1.2 times that in the control group. Also, the feed conversion ratio was lower in the test groups than in the control group.

EXAMPLE 3

Holstein male calves directly after weaning were divided into one control group and two test groups with one group being five calves and they were test-bred for 60 days. A commercially available substitute milk for calves was supplied to the control group and a mixture of 100 parts by weight of the substitute milk supplied to the control group and 0.36 part by weight, 0.73 part by weight or 1.47 parts by weight of the saccharides containing fructooligosaccharide obtained in the production example described hereinbefore was supplied to the test group. A definite amount of the feed was given to each calf once a day and water was ingested freely. At the initiation of the test and at the end of the test, the weight of each calf was measured and the weight increase was determined.

Also, during the period from the initiation of the test to the end of the test, the state of occuring the scours and loose passage was checked every day as a means for observing the health condition of the calves.

The results thus obtained are shown in Table 2.

TABLE 2

| Breeding test results of calves | | |
|---|---|---|
| Percentage of fructooligosaccharide in feed | Relative ratio of body weight gain | Occuring state of the scours and loose passage |
| none | 100 | very large |
| 0.36 | 106 | small |
| 0.73 | 102 | small |
| 1.47 | 118 | very small |

The results showed that the weight increase was larger in each test group than in the control group and the weight increase in the test group was 1.02 to 1.18 times that in the control group. Also, the occurrence state of the scours and loose passage was less in the test group.

EXAMPLE 4

White Leghorn Bsbcock male chickens of 4-day age were divided into one control group and two test groups with one group being 30 chickens and they were test-bred for one week. A commercially available feed for young chicken was supplied to the control group and a mixture of 100 parts by weight of the feed as supplied to the control group and 0.25 part by weight of 0.5 part by weight of the saccharides containing fructooligosaccharide was supplied to each of the test groups. The feed was supplied by the form of a ceaseless supply and water was ingested freely. At the initiation of the test and at the end of the test, the weight of each chicken was measured. Also, the amounts of the feed intake during the breeding period were summed up and the feed conversion ratio of determined.

The results thus obtained are shown in Table 3.

TABLE 3

| Breeding test results of chickens | | |
|---|---|---|
| Percentage of fructooligosaccharide in feed | Relative ratio of body weight gain | Relative ratio of feed conversion |
| none | 100 | 100 |
| 0.25 | 121 | 77 |
| 0.50 | 102 | 95 |

The results showed that the weight increase was larger in each of the test groups than in the control group and the weight increase in the test groups was 1.02 and 1.21 times that in the control group. Also, feed conversion ratio was better in the test groups and the feed conversion rato in the test groups was 0.95 to 0.77 times that in the control group. In the comparison between the test groups, the test group using the feed containing 0.25% the saccharides was better in the weight increase and the feed conversion ratio than the test group using the feed containing 0.50% the saccharides.

What is claimed is:

1. A method for increasing the weight of young domestic animals which comprises feeding said animals during their weaning period a commercially available feed containing from about 0.1 to 5 parts by weight fructooligosaccharide per 100 parts of said feed, whereby scours of said animals are substantially remedied.

2. The method of claim 1 wherein from about 0.1 to about 2.0 parts by weight fructooligosaccharide is used.

3. The method of claim 1 wherein from about 0.1 to about 0.5 parts by weight fructooligosaccharide is used.

* * * * *